UNITED STATES PATENT OFFICE.

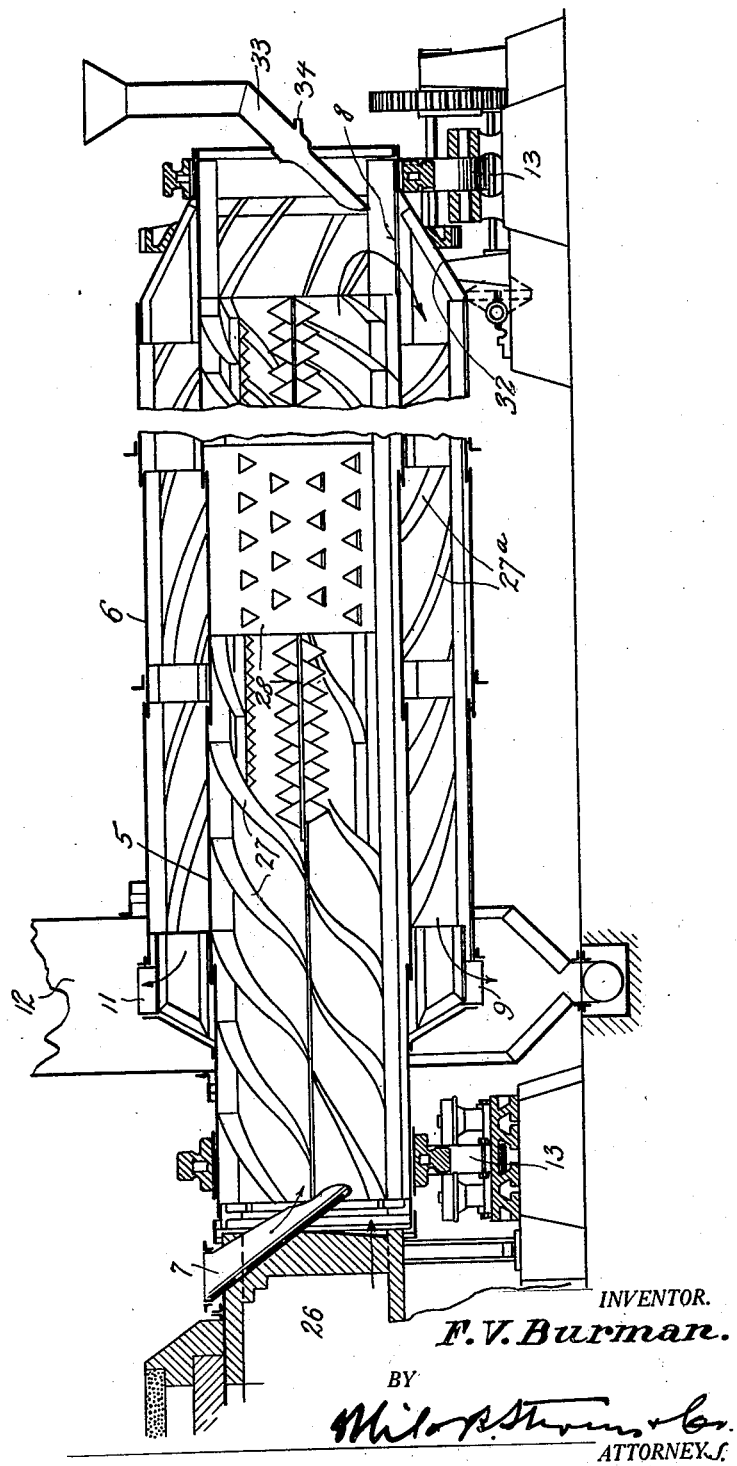

FRANK V. BURMAN, OF MARINE CITY, MICHIGAN.

PULP-DRIER.

1,370,085.  Specification of Letters Patent.  Patented Mar. 1, 1921.

Application filed April 21, 1920. Serial No. 375,598.

*To all whom it may concern:*

Be it known that I, FRANK V. BURMAN, a citizen of the United States, residing at Marine City, in the county of St. Clair and State of Michigan, have invented new and useful Improvements in Pulp-Driers, of which the following is a specification.

This invention relates to drying apparatus in which the material is dried by being passed through a revolving cylinder or drum. An apparatus of this type is disclosed in my Patent No. 1,336,422, and the present invention has for its object to provide the apparatus with certain improvements to be described hereinafter in detail and claimed.

In order that the invention may be better understood, reference is had to the accompanying drawing in which a longitudinal section of the apparatus is shown.

In the drawing, 5 and 6 denote, respectively, two concentrically arranged and horizontally positioned cylinders adapted to receive the wet pulp or other material to be dried. The drum 5 is inside the drum 6 and is open at one end to receive the material from a discharge chute 7 extending into said end and leading from a suitable conveying apparatus. The other end of the drum 5 also has an opening 8 to discharge into the corresponding end of the outer drum as shown by the arrow in the drawing, and it passes through this drum to an outlet 9 at the opposite end thereof. The last-mentioned end of the drum 6 also has a vapor outlet 11 into a flue 12.

The two drums are fastened together in any approved manner to rotate as one, and the outer drum 6 is shorter than the inner drum 5 so as to leave the ends of the latter projecting from the former. These projecting ends of the drum 5 are suitably supported on rollers 13 as usual so as to be free to rotate, and means are provided for driving the drum. These driving means need not be described as they form no part of the present invention.

The front end of the drum 6 is next to the source of heat, the same being a furnace 26 which supplies hot air to the drums.

In the drum 5 are flights 27 in screw form for urging the material to the rear end thereof for discharge into the drum 6, and in the drum 6 are similar flights 27$^a$, but reversely arranged to carry the material back to the outlet 9. The drum 5 also contains the apertured and toothed partition plates 28 disclosed and claimed in the application hereinbefore referred to.

In order to facilitate the passage of the material into the drum 6, its receiving end onto which the material drops as it is discharged from the drum 5, is made conical as shown at 32. The incline thus formed allows the material to slide freely down into the drum and prevents it from gathering in the corners and burning.

The forward projecting end of the drum 5 is of course closed and it is entered by an auxiliary delivery chute 33 discharging on the inclined surface 32 of the drum 6. The purpose of this auxiliary feed chute is to allow partially dried material to be dumped into the drum 6, so that in traveling forwardly to the outlet 9 it is thoroughly dried. The chute 33 has an observation hole 34 so that it is made possible to observe the condition of the material in the apparatus, and properly regulate the heat.

I claim:

1. In a drying apparatus, a pair of rotatable drums located one inside the other, the inner drum having a material inlet at one end and an outlet at the opposite end into the corresponding receiving end of the outer drum, and the outer drum having an outlet at its end opposite its receiving end, said receiving end of the outer drum being conical, and an auxiliary material feeding means discharging on the receiving end of the outer drum.

2. In a drying apparatus, a pair of rotatable drums located one inside the other, the inner drum having a material inlet at one end and an outlet at the opposite end into the corresponding receiving end of the outer drum, and the outer drum having an outlet at its end opposite its receiving end, said receiving end of the outer drum being conical, an auxiliary material feeding means discharging on the receiving end of the outer drum, said means having on the outside of the drums an observation hole into the interior of the drums.

In testimony whereof I affix my signature.

FRANK V. BURMAN.